UNITED STATES PATENT OFFICE.

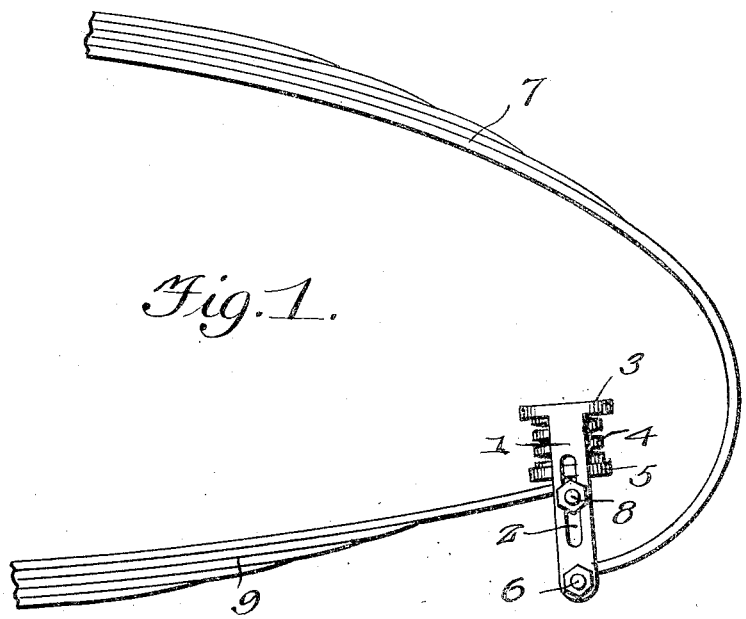
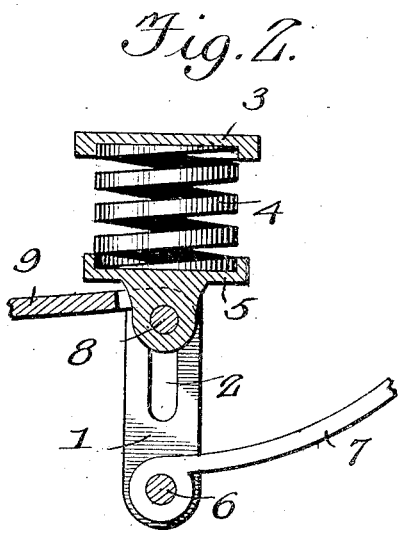
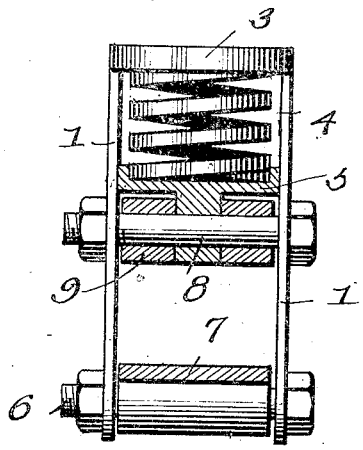

WILLIAM J. WALLACE, OF DETROIT, MICHIGAN.

SHOCK-ABSORBER.

1,109,560.     Specification of Letters Patent.     Patented Sept. 1, 1914.

Application filed October 18, 1913. Serial No. 795,969.

*To all whom it may concern:*

Be it known that I, WILLIAM J. WALLACE, a citizen of the United States, residing at Detroit, in the county of Wayne and State of Michigan, have invented new and useful Improvements in Shock-Absorbers, of which the following is a specification.

The present invention provides a yieldable shock absorber for vehicle springs of the type embodying a cushioning spring, such device being readily adaptable to springs of various types whether elliptical, semi-elliptical, scroll or the like.

The invention embodies a frame provided with a rest, a second rest movable in the frame, a cushioning spring between the rests and bolts for connecting the parts to the device, one of such bolts being fixed with reference to the frame and movable therewith and the other bolt being movable with reference to the frame and engaging one of the before mentioned rests to sustain the thrust of the cushioning spring.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a side view of a vehicle spring provided with a shock absorber embodying the invention. Fig. 2 is a longitudinal section of the parts shown in Fig. 1. Fig. 3 is a front view of the shock absorber, parts being broken away.

Corresponding and like parts are referred to in the following description, and indicated in all the views of the drawing, by the same reference characters.

The device embodies a frame 1 which is approximately of U form, the side members being provided with opposed slots 2 arranged lengthwise thereof. The cross piece connecting the side members of the frame at one end is widened to form a rest 3, which is flanged at its outer edges to engage and retain a cushioning spring 4 in place. A second rest 5 is located between the side members of the frame and is movable toward and away from the fixed rest 3 and is likewise flanged to engage the opposite end of the cushioning spring 4 to retain the latter in proper position. A bolt 6 connects the free ends of the side members of the frame 1 and also serves to connect the device to one end of a spring 7 or like part. A bolt or fastening 8 has its terminal portions fitted in the slots 2 and is movable in such slots. The rest 5 engages the bolt or fastening 8 and moves therewith. A spring 9 or like part is connected to the bolt or fastening 8 and is movable therewith.

From the foregoing, taken in connection with the accompanying drawing, it will be understood that the shock absorber partakes of the nature of a shackle, since it serves to couple the parts to be connected. When the vehicle passes over an obstruction or drops into a rut the cushioning spring 4 is compressed and when the parts assume a normal condition the bolt or fastening 8 moves in the slots 2, thereby compensating for the rebound and preventing shock or jolt being transmitted to the vehicle.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:

A shock absorber comprising a U-shaped frame embodying a cross piece and integral parallel side members, the cross piece being widened and flanged at its outer edge and the side members having opposed longitudinal slots, a bolt connecting the free ends of the side members and forming attaching means to receive one of the parts to which the shock absorber is applied, a rest movable between the side members and formed with a flange on its outer edge upon the side facing the cross piece of the frame, a bolt engaging the rest and movable in the longitudinal slots of the side members and serving to engage the other one of the parts to which the shock absorber is applied, and a cushioning spring arranged between the side members of the cross piece and the rest and retained in place by the flanges of the said cross piece and rest.

In testimony whereof I affix my signature in presence of two witnesses

WILLIAM J. WALLACE.

Witnesses:
　JAS. L. SAVILLE,
　GRACE SAVILLE.